UNITED STATES PATENT OFFICE.

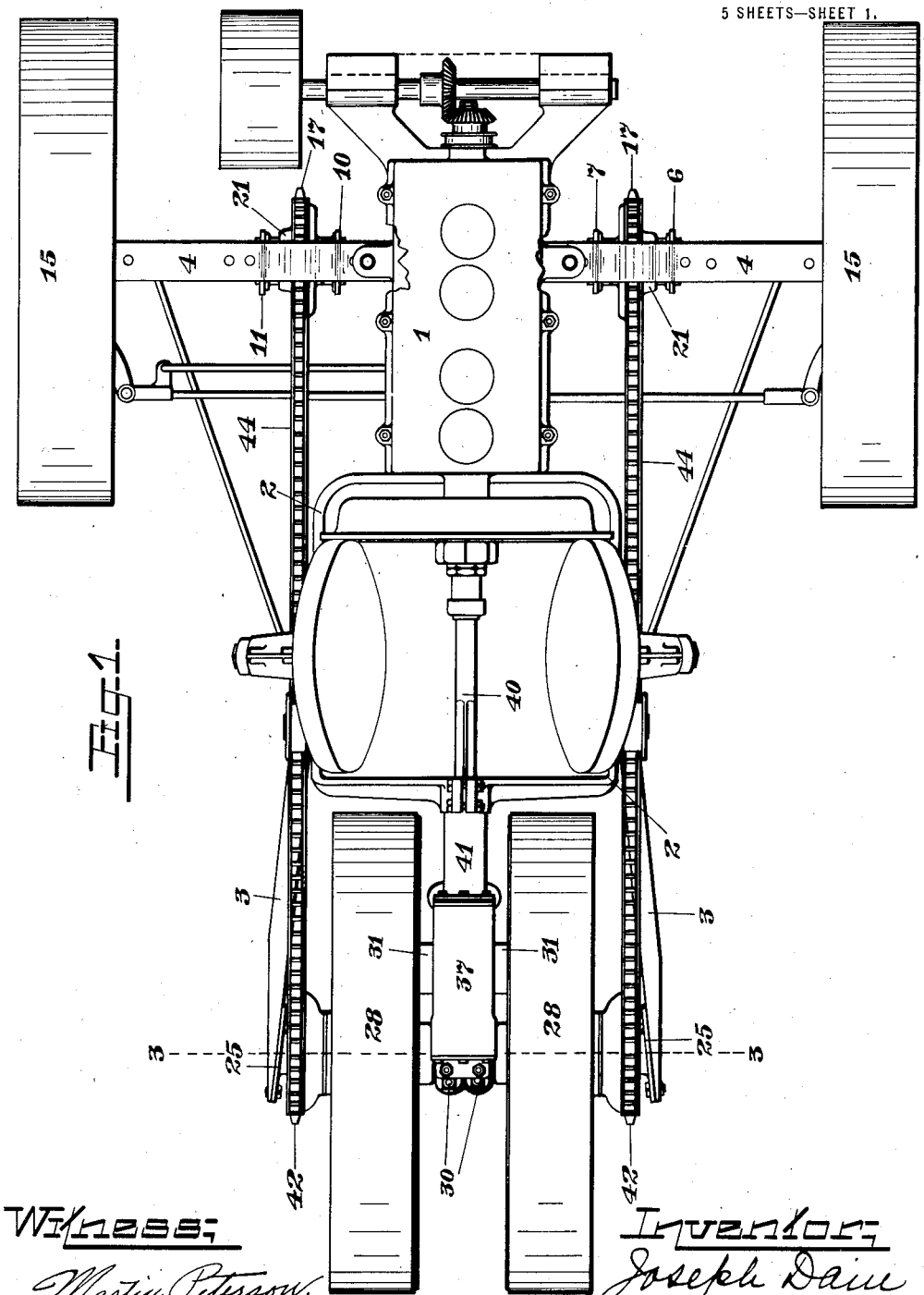

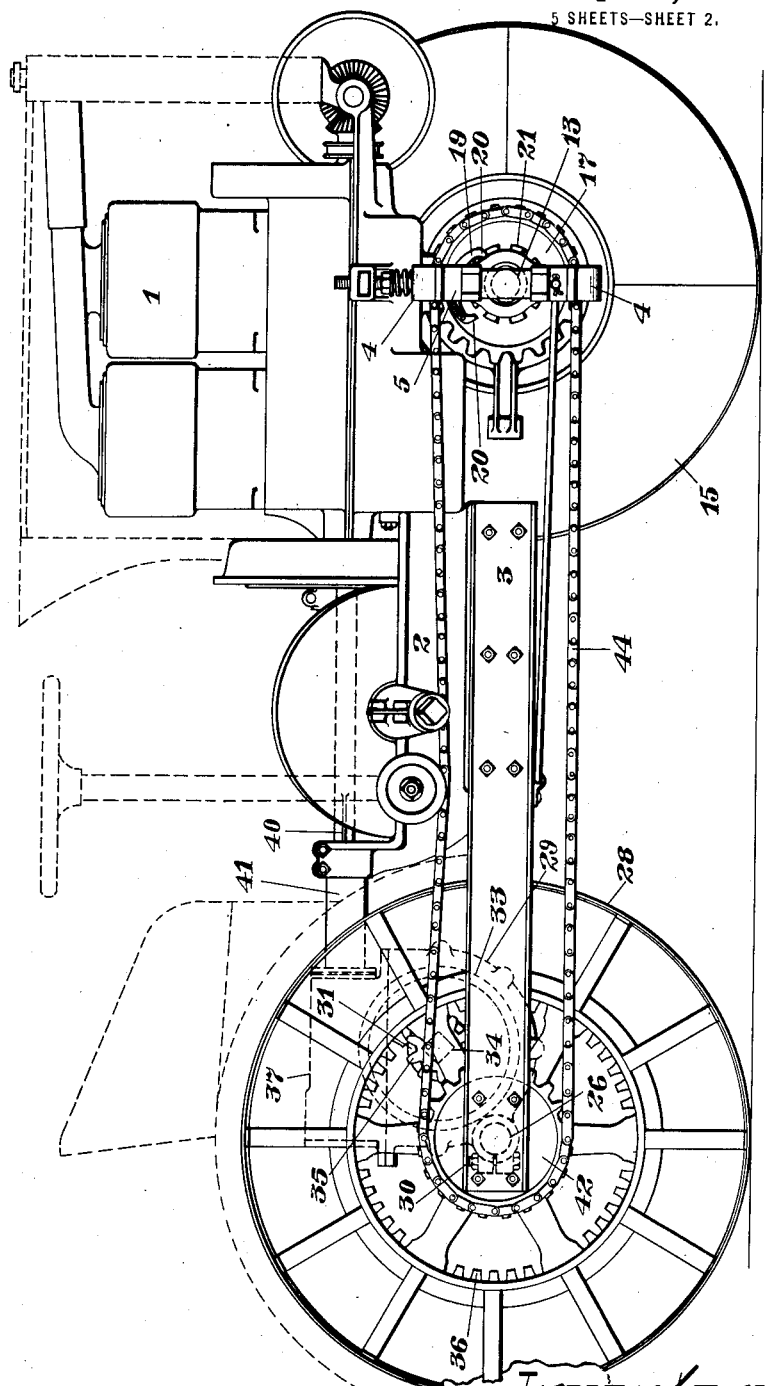

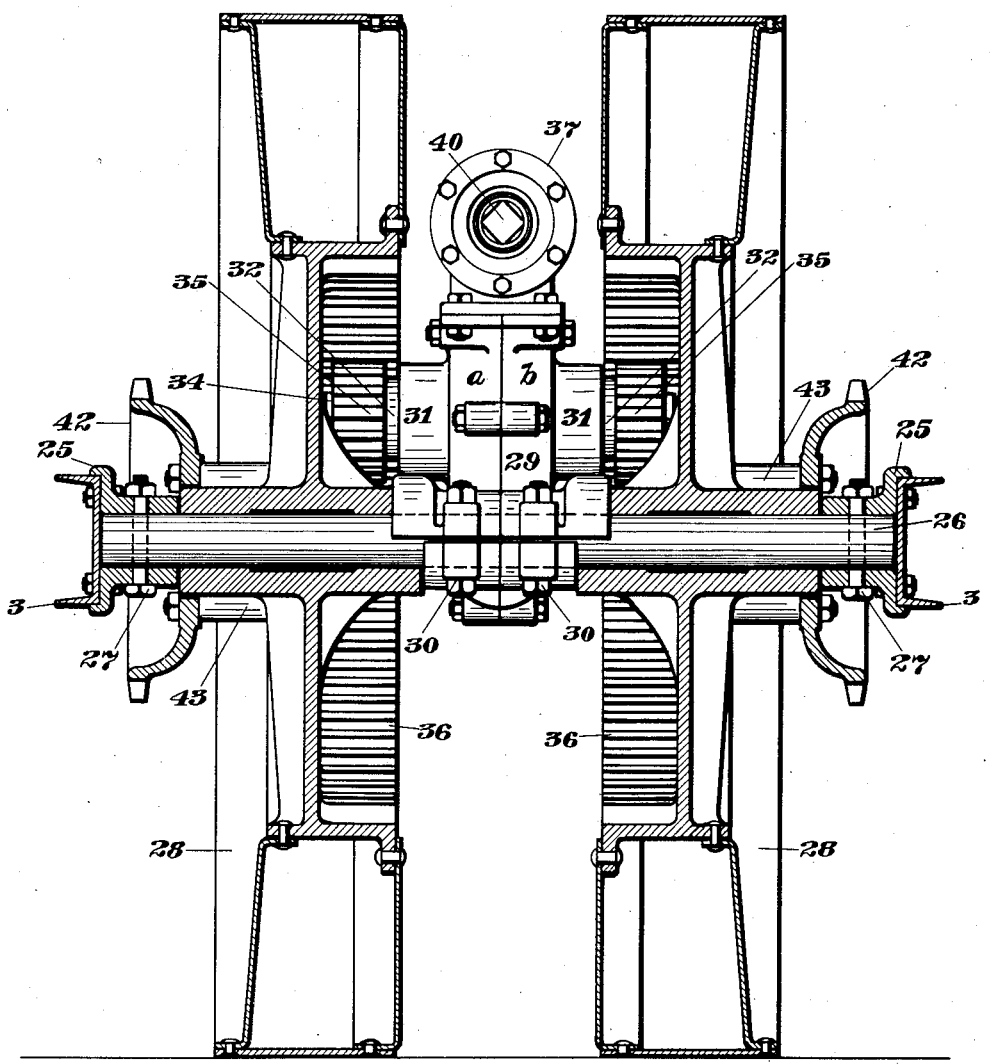

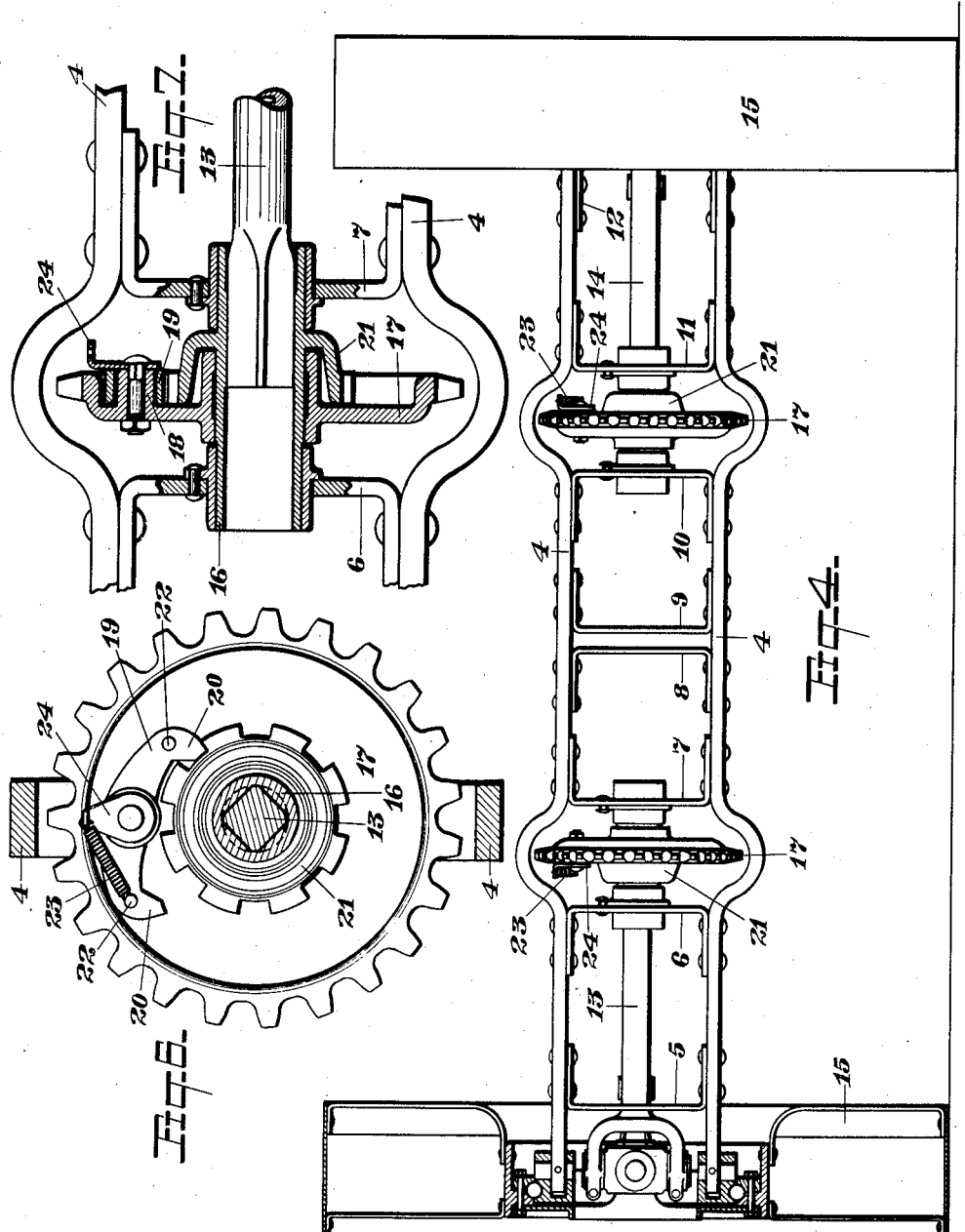

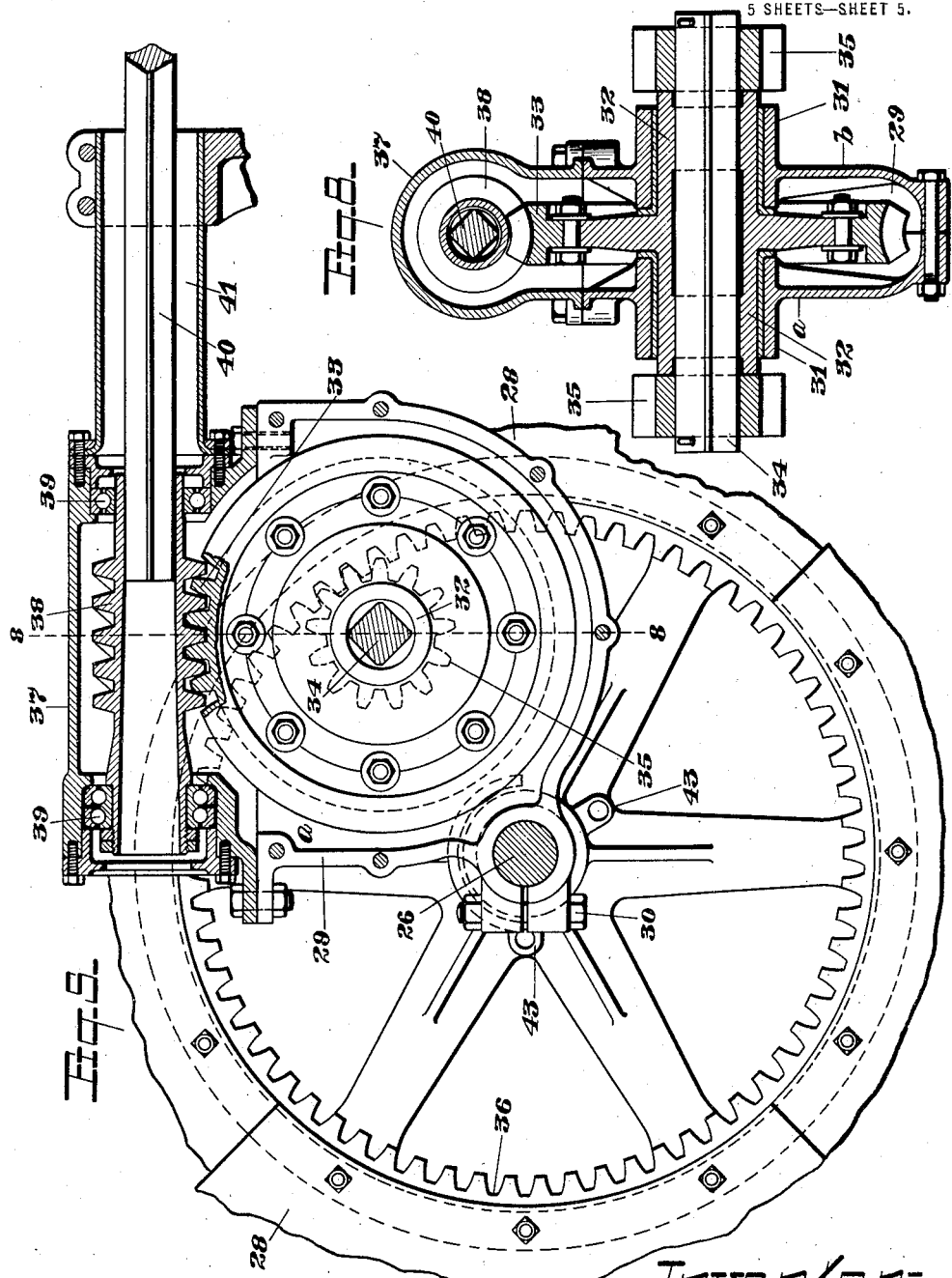

JOSEPH DAIN, OF MOLINE, ILLINOIS, ASSIGNOR TO DEERE AND COMPANY, OF MOLINE, ILLINOIS, A CORPORATION OF ILLINOIS.

TRACTOR.

1,390,986.      Specification of Letters Patent.      Patented Sept. 20, 1921.

Application filed July 12, 1915, Serial No. 39,465. Renewed February 10, 1921. Serial No. 444,023.

*To all whom it may concern:*

Be it known that I, JOSEPH DAIN, a citizen of the United States, residing at Moline, in the county of Rock Island and State of Illinois, have invented certain new and useful Improvements in Tractors, of which the following is a specification, reference being had therein to the accompanying drawing.

My invention relates to tractors employed more particularly for agricultural purposes, and the object of my invention is to provide an effective means of transmitting power from the engine to the tractor wheels, other objects being clearly set forth in the following specification.

Refering to the drawings in which similar numerals indicate identical parts—

Figure 1 is a plan view of a tractor embodying my invention.

Fig. 2 is a side elevation of Fig. 1 with the near front wheel removed.

Fig. 3 is a section on the line 3—3 of Fig. 1.

Fig. 4 is a detail elevation of the front axle in part section.

Figs. 5, 6 and 7 are details, and

Fig. 8 is a section on the line 8—8 of Fig. 6.

In the tractor shown an engine 1 of a desired type is mounted on a suitable frame composed of an extension 2 of the engine base and beams 3 secured thereto. The engine 1 is mounted on a front axle composed of upper and lower parallel beams 4 spaced apart by a series of struts 5, 6, 7, 8, 9, 10, 11 and 12 rigidly secured thereto. The forward tractor wheels are dirigible as fully described and illustrated in my pending application filed April 4th, 1914, Serial No. 829,654; the outer ends of the bars 4 are connected to a part of the hubs about which the wheels 15 rotate; the wheels 15 are connected to and adapted to be rotated by shafts 13 and 14 which are squared at their inner ends to fit within sleeves 16 journaled in suitable bearings in the struts 6 and 7 and 10 and 11; the shafts 13 and 14 extend outwardly and through the struts 5 and 12 to connection with the wheels 15. Mounted loosely on the sleeves 16 are sprocket wheels 17 each having on its outer face a stud 18 on which is supported intermediate its ends a rocking dog 19 having at each end a tooth 20 adapted to engage with notches in a ratchet wheel 21 preferably integral with the sleeve 16. The outer faces of the teeth 20 are adapted to engage with the notches in the ratchet wheel 21 to turn the latter as will be more fully hereinafter explained; on the rocking dog 19, adjacent the teeth 20, are pins 22 to one of which is connected a coil spring 23, the latter extending to an arm 24 rigidly mounted on the stud 18; the spring 23 is connected to the arm 24, and its tension is exerted to hold the dog 19 in such a position that one of the teeth 20 will always be in engagement with the notches on the ratchet wheel 21. The bars 4 are bent outwardly as shown to provide sufficient space for movement of the sprocket wheels 17.

The rear tractor wheels 28 are mounted on the beams 3 in the following manner; bolted to the beams 3 are supporting members 25 in which an axle 26 is supported and secured against rotation by bolts 27 which pass through the members 25 and the axle 26. The wheels 28 are supported on the shaft 26 and are spaced apart by a housing 29; the housing 29 is preferably formed of two sections *a* and *b* securely bolted together and supported on the axle 26 by the lower forward portion of *a* and *b* which are split and clamped to the axle 26 by bolts 30. Projecting from the sections *a* and *b* of the housing 29 are bearings 31 in which is journaled the hub 32 of a worm gear 33 inclosed within the housing 29; the hub 32 is tubular and for a portion of its length at each end is squared to fit on a squared shaft 34 which extends through the hub 32. Rigidly secured on the ends of the shaft 34 are pinions 35 meshing with annular gears 36 forming parts of the traction wheels 28. A housing 37 is bolted in place upon the top of the housing 29 and incloses a worm 38 supported on anti-friction bearings 39 at each end of the housing 37 and in constant mesh with the worm gear 33.

In illustrating my invention I have shown a well known form of friction transmission, but I do not limit myself to any particular type as it is obvious any one of various kinds of transmission can be used with equal efficiency, or I may dispense with a transmission and take the drive from the engine direct. A power shaft 40 transmits the power from the engine 1 to the worm 38 the latter being tubular and having its forward end squared interiorly to engage with the squared rear end of the power shaft 40 which projects through a sleeve 41 secured to the extension 2 of the engine frame 3, and to the forward end of the housing 37. Sprocket wheels 42 are bolted or otherwise rigidly secured to bosses 43, integral preferably with the hubs of the wheels 28, and connect with the sprocket wheels 17 by sprocket chains 44; the wheels 42 are smaller in diameter than the wheels 17 and have one less sprocket, consequently the speed of their rotation is greater than the speed of rotation of the sprocket wheels 17, the latter, during normal working of the tractor, rotating loosely on the shafts 13 and 14.

The power from the engine is transmitted through the shaft 40 to rotate the worm 38 which is in mesh with the worm gear 33, actuating the latter and the pinions 35 connected therewith; the pinions 35 meshing with the annular gears 36 the wheels 28 are rotated to impart motion to the tractor; as the sprocket wheels 17 are loose upon the shafts 13 and 14 it is obvious that no part of the engine force is conveyed to rotate the front tractor wheels 15 which are rotated by contact with the ground as the tractor moves; as the tractor wheels 15 rotate a similar rotation is imparted to the shafts 13 and 14 and to the ratchet wheels 21; the tractor wheels 28 and 15 traveling at the same speed and the sprocket wheels 42 being smaller than the sprocket wheels 17, which are loosely supported on the shafts 13 and 14, it follows that the rotary speed of the tractor wheels 15 and the ratchet wheels 21 is greater than the rotary speed of the sprocket wheels 17, consequently the notches of the ratchet wheels 21 will slip by the teeth 20 of the dogs 19 engaged therewith, the inner edge of the teeth 20 being beveled for that purpose.

It is frequently the case that the ground over which the tractor travels is sufficiently moist to render the soil soft to such a degree that the tractor wheels 28, rotated by power direct from the engine, will slip upon the surface or sink into the ground and rotate in the depression and halt the progress of the tractor, in that event the tractor wheels 15 will cease their rotation, the rear wheels 28 however will continue to be driven by the engine power, but as they slip, or fail to catch, the tractor is stationary until the traction power of the wheels 15 is utilized. As before stated the sprocket wheels 17 are loosely mounted, and are rotated by the chain 44 connected with the sprocket wheels 42 which are actuated by the tractor wheels 28, it therefore follows that the dogs 19 on the sprocket wheels 17 will engage with one of the notches in the ratchet wheels 21 causing the latter to rotate, and as they are fixed upon the shafts 13 and 14 the latter are actuated to rotate the tractor wheels 15 so that their traction power will be added to the traction power of the wheels 28 until the latter are again able to catch the ground and progress thereon or be raised from the depression in which they may be stalled.

As previously stated in ordinary conditions of travel of the tractor on firm ground the rear tractor wheels 28 only are rotated by the engine power, the tractor wheels 15 rotating by contact with the ground, consequently both rear and front wheels travel at the same speed, and it is only when the rear wheels 28 slip from weight of a load or in soft ground, and the travel of the tractor is consequently retarded, that the wheels 15 are automatically connected with the power of the engine to add their traction power to the traction power of the wheels 28. It will be readily understood that if the sprocket wheels 42 and 17 were alike the power of the engine would be exerted alike upon all the tractor wheels, but by making the sprocket wheels 42 smaller than the sprocket wheels 17 the full engine power is exerted upon the wheels 28, the rotation of the wheels 15 being caused by the travel of the tractor until such conditions as I have mentioned have been met with and the traction power of either or both of the wheels 15 is necessary to the travel of the tractor, for as the wheels 15 are mounted on separate shafts or axles, they rotate independently, and either of them, should anything occur to retard the normal speed of its rotation will be automatically actuated by power from the motor.

In making a turn with the tractor, for instance to the left, the speed of travel of the left wheel over the ground decreases as the wheels are swung laterally at an angle to the direct line of travel until the difference between the speed of travel of the left wheel and the power driven element is sufficiently great to cause the power of the motor to be transmitted to the left wheel. The particular point or movement when power is automatically transmitted to the wheels in turning is determined by the sprocket wheels 42 and 17, for if the number of teeth on the latter were decreased, or the number of teeth on the wheels 42 were increased, it is evident that the automatic action will be much more sensitive, and under such a construction a slight swing laterally of the wheels 15 will cause a quicker application of power from the motor to one or both of the wheels when making a turn, and the same quick action would result if the tractor was traveling straight ahead. If the power driven element slips in rotating at the beginning or during a turn then power is transmitted automatically to the left wheel, and if the left wheel also slips at the same time then power is automatically transmitted to the right wheel. It is evident that a similar action will occur if the tractor is turned to the right.

When it is desired that the tractor shall move bodily backward I disconnect the coil spring from the rear pin 22 on the dog 19 and connect it with the forward pin 22, this will bring the rear tooth 20 of the rocking dog 19 into engagement with the ratchet wheel 21, so that slipping of the wheels 28 will operate, as before explained, to utilize the traction power of the wheels 15, the parts operating as before stated.

While I have shown the motor power applied to the rear wheels, I do not limit myself to such construction, as the motor power can be applied to the forward supporting wheels, and the rear wheels be free to rotate by contact with the ground, power from the motor being applied to the rear wheels in the same manner and for the same purpose as described for the forward wheels.

As shown and described my preference is to apply the full power of the motor to one of the rotatable supporting elements to move the tractor, yet at the same time making it possible to transmit power from the motor to the other rotatable supporting element so that the traction power of the latter can be utilized when necessary resulting in an economy of construction and operation without any impairment of efficiency.

As I have heretofore explained the sprockets 42 are smaller in diameter than the sprocket wheels 17 and have one less sprocket, consequently the speed of their rotation is greater than the speed of rotation of the sprocket wheels 17, the latter, during normal working of the tractor, rotating loosely on the shafts 13 and 4; this construction and operation of parts may be departed from and a similar result be obtained by making the sprockets 17 and 42 alike, and having the rotatable supporting element driven by the motor of greater diameter than the other supporting element.

As illustrated and described the supporting element on which the tractor moves over the ground is composed of tractor wheels of a type ordinarily used on tractors, but I do not limit myself to the use of wheels of this kind, as it is entirely practical to employ caterpillar wheels, or a combination of tractor wheels and caterpillar wheels, to which my invention can be readily applied and prove equally effective.

What I claim is—

1. A tractor having in combination a forward rotatable supporting element and a rearward rotatable supporting element, a motor, means to rotate one of said elements to move the tractor by power from the motor, the other element rotating by contact with the ground, both of said elements adapted to move over the ground normally at the same speed, and means to automatically rotate said other element by power from the motor when the power driven element slips in rotating.

2. A tractor having in combination a forward rotatable supporting element and a rearward rotatable supporting element, a motor, means to rotate one of said elements to move the tractor by power from the motor, the other element rotating by contact with the ground, both of said elements adapted to move over the ground normally at the same speed, and means to automatically connect the power driven rotating element with the other element to utilize the power of both elements to move the tractor when the power driven element slips in rotating.

3. A tractor having in combination a forward rotatable supporting element and a rearward rotatable supporting element, a motor, one of said elements having direct connection with the motor to be driven thereby, the other element rotating by contact with the ground, both of said elements adapted to move over the ground normally at the same speed, and means to automatically actuate one of said elements by motor power when the power driven element slips in rotating.

4. A tractor having in combination a forward rotatable supporting element, a rearward rotatable supporting element, a motor, means to transmit power from the motor to one of said elements to move the tractor in a forward or rearward direction, the other element rotating by contact with the ground, both of said elements adapted to move over the ground normally at the same speed, and means to automatically actuate one element by motor power when the power driven element slips in rotating.

5. A tractor having in combination a forward rotatable supporting element, a rearward rotatable supporting element, a motor, an axle upon which one of said elements is mounted, means mounted on the axle and connecting the element thereon to the motor to rotate said element, the other element rotating by conact with the ground, both of said elements adapted to move over the ground normally at the same speed, and means to automatically actuate the other element by motor power when the power driven element slips in rotating.

6. A tractor having in combination a forward rotatable supporting element, a rearward rotatable supporting element, a motor, a rigid axle upon which one of said elements is rotatably mounted, a train of gearing connected with said supporting element and with the motor to actuate the former to move the tractor, the other element rotating by contact with the ground, both of said supporting elements adapted to move over the ground normally at the same speed, means connecting both supporting elements, and automatically actuable means to rotate the other element by motor power when the power driven element slips in rotating.

7. A tractor having in combination a forward rotatable supporting element and a rearward rotatable supporting element, a motor connected with one of said supporting elements to rotate the latter, the other supporting element rotatable by contact with the ground, both of said elements adapted to move over the ground normally at the same speed, and means to automatically connect the power driven element with the other element when the power driven element slips in rotating.

8. A tractor having in combination forward and rearward rotatable supporting elements, a motor connected with one of said supporting elements to rotate the latter, the other supporting element rotatable by contact with the ground, both of said elements adapted to move over the ground normally at the same speed, a sprocket wheel on the motor driven element and rotatable therewith, a sprocket wheel adapted to be connected with the other supporting element but freely rotating when both supporting elements are moving over the ground at the same speed, a chain connecting the sprocket wheel on the motor driven supporting element with the sprocket wheel on the other element, and means to automatically connect the latter supporting element and sprocket wheel to rotate said element by power when the power driven element slips in rotating.

9. A tractor having in combination forward and rearward rotatable supporting elements, a motor, means connecting the motor with one of said elements to rotate the latter to move the tractor, the other element rotating by contact with the ground, both of said elements adapted to move over the ground normally at the same speed, a sprocket wheel on the motor driven supporting element and rotatable therewith, a sprocket wheel of a greater diameter adapted to be connected with the other supporting element but freely rotating when both supporting elements are moving over the ground at the same speed, a chain connecting the sprocket wheel on the motor driven supporting element with the sprocket wheel on the other element, and means to automatically connect the latter supporting element and sprocket wheel to rotate said element by power when the power driven element slips in rotating.

10. A tractor having in combination forward and rearward rotatable supporting elements, a motor, means connecting the motor with one of said elements to rotate with the rearward supporting element to move the tractor, the other element rotating by contact with the ground, both of said elements adapted to move over the ground normally at the same speed, and means to automatically rotate said forward element by power from the motor when the power driven element slips in rotating.

11. A tractor having in combination a frame, a rotatable element supporting one end of the frame and comprising oppositely disposed dirigible wheels adapted to be swung laterally in unison to steer the tractor, a motor, a rotatable element supporting the other end of said frame and actuated by power from the motor to move the tractor, the first mentioned element rotating by contact with the ground, and means to automatically rotate one or both of said wheels by power from the motor when the power driven element slips in rotating.

12. A tractor having in combination a frame, a rotatable element comprising oppositely disposed dirigible wheels supporting one end of the said frame and adapted to be swung laterally in unison to steer the tractor, a rotatable element supporting the other end of said frame, a motor, means to rotate one of said elements to move the tractor by power from the motor, the other element rotating by contact with the ground, both of said elements adapted to move over the ground normally at the same speed, and means to automatically rotate one or both of said wheels by power from the motor when the power driven element slips in rotating.

13. A tractor having in combination a forward rotatable supporting element comprising oppositely disposed dirigible wheels, a rearward supporting element, a motor, means to rotate said rearward element to move the tractor by power from the motor, the other element rotating by contact with the ground, both of said elements adapted to move over the ground normally at the same speed, and means to automatically rotate one or both of said wheels by power from the motor when the rearward element slips in rotating.

14. A tractor having in combination a frame, a rotatable element supporting one end of the frame and comprising oppositely disposed, dirigible wheels adapted to be swung laterally in unison to steer the tractor, a motor, a rotatable element supporting the other end of the frame and actuated by power from the motor to move the tractor, the first mentioned element rotating by contact with the ground, means to automatically rotate one of said wheels by power from the motor when the tractor is turning and the power driven element slips in rotating, and means to automatically rotate the opposite wheel by power from the motor when the first mentioned wheel and the power driven element slip in rotating.

15. A tractor having in combination forward and rearward rotatable supporting elements, a motor, means connecting the motor with one of said elements to rotate the latter to move the tractor, the other element rotating by contact with the ground, both of said elements adapted to move over the ground normally at the same speed, and means to automatically rotate said other element by power from the motor when the speed of rotation of said element is less than the speed of rotation of the power driven element.

16. A tractor having in combination forward and rearward rotatable supporting elements, a motor, means connecting the motor with one of said supporting elements to rotate the latter to move the tractor, the other element rotating by contact with the ground, both of said elements adapted to move over the ground normally at the same speed and means to connect the power driven element with the other element to rotate the latter by power from the motor when the speed of rotation of said other element is less than the speed of rotation of the power driven element.

17. A tractor having in combination a frame, a rotatable element comprising oppositely disposed dirigible wheels supporting one end of said frame and adapted to be swung laterally in unison to steer the tractor, a motor, a rotatable element supporting the other end of said frame and driven by power from the motor to move the tractor, the wheels rotating normally by contact with the ground, and means to automatically rotate either of said wheels by power from the motor when the speed of rotation thereof is less than the speed of the power driven element.

18. A tractor having in combination a frame, a rotatable element supporting the forward end of the frame and comprising oppositely disposed dirigible wheels adapted to be swung laterally in unison to steer the tractor, a motor, a rotatable element supporting the rear of the frame and actuated by power from the motor to move the tractor, the first mentioned element rotating by contact with the ground, means to automatically rotate one of said wheels by power from the motor when the tractor is turning and the power driven element slips, and means to automatically rotate the opposite wheel by power from the motor when the speed of rotation of said wheel is less than the speed of rotation of the first mentioned wheel and the power driven element.

19. A tractor having in combination a frame, a rotatable element supporting one end of the frame and comprising oppositely disposed dirigible wheels adapted to be swung laterally in unison to steer the tractor, a motor, a rotatable element supporting the other end of the frame and actuated by power from the motor to move the tractor, the first mentioned element rotating by contact with the ground, means to automatically rotate one of said wheels by power from the motor when the tractor is turning and the speed of rotation of said wheel is less than the speed of the power driven element, and means to automatically rotate the opposite wheel by power from the motor when the normal speed of rotation of said wheel is less than the speed of rotation of the first mentioned wheel and the power driven element.

20. A tractor having in combination a frame, a motor on said frame, two normally equally peripherally speeded traction wheels, two power transmitters, one continuously engaging with one of said traction wheels, and the other intermittently brought automatically into engagement with the other of said traction wheels while the first wheel is peripherally slipping.

21. A tractor having in combination a frame, a motor on said frame, two traction wheels having normally equal peripheral speeds, two power transmitters, one continuously engaging with one of said traction wheels, and the other adapted to be brought automatically into engagement with the second of said traction wheels when the peripheral speed of the first wheel exceeds the peripheral speed of the second wheel.

22. In combination a frame, a motor on said frame, two traction wheels having normally equal peripheral speeds, two power transmitters, one continuously engaging with one of said traction wheels and the other adapted to transmit power to the second of the said traction wheels when the peripheral speeds of the wheels are unequal.

In testimony whereof I affix my signature, in presence of two witnesses.

JOSEPH DAIN.

Witnesses:
JESSIE SIMSER,
W. G. DUFFIELD.